(12) United States Patent
Mezaki

(10) Patent No.: US 11,230,119 B2
(45) Date of Patent: Jan. 25, 2022

(54) LIQUID DISCHARGE APPARATUS, LIQUID DISCHARGE METHOD, AND NON-TRANSITORY RECORDING MEDIUM

(71) Applicant: Ricoh Company, Ltd., Tokyo (JP)

(72) Inventor: Daisuke Mezaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/907,426

(22) Filed: Jun. 22, 2020

(65) Prior Publication Data

US 2021/0031541 A1   Feb. 4, 2021

(30) Foreign Application Priority Data

Jul. 29, 2019   (JP) .............. JP2019-139220

(51) Int. Cl.
    *B41J 11/00*    (2006.01)
    *B41M 7/00*     (2006.01)
    *C09D 11/101*   (2014.01)

(52) U.S. Cl.
    CPC ........ *B41J 11/00212* (2021.01); *B41J 11/002* (2013.01); *B41J 11/00214* (2021.01); *B41J 11/00216* (2021.01); *B41M 7/0081* (2013.01); *C09D 11/101* (2013.01)

(58) Field of Classification Search
    CPC ................ B41J 2/00212; B41J 2/00214; B41J 2/00216; B41M 7/0081
    See application file for complete search history.

(56) References Cited

U.S. PATENT DOCUMENTS

| | | | |
|---|---|---|---|
| 2007/0058021 A1* | 3/2007 | Kusunoki | B41J 11/002 347/102 |
| 2012/0086749 A1* | 4/2012 | Mitsuzawa | B41J 19/142 347/14 |
| 2015/0158311 A1* | 6/2015 | Ogasawara | B41J 11/002 347/16 |
| 2016/0152043 A1 | 6/2016 | Mezaki | |

(Continued)

FOREIGN PATENT DOCUMENTS

| | | |
|---|---|---|
| JP | 2013-064794 | 4/2013 |
| JP | 2013-067770 | 4/2013 |

(Continued)

*Primary Examiner* — Matthew Luu
*Assistant Examiner* — Kendrick X Liu
(74) *Attorney, Agent, or Firm* — Xsensus LLP

(57) ABSTRACT

A liquid discharge apparatus includes a discharge device configured to discharge a liquid curable by active-energy rays onto a discharge target to form a liquid discharge surface, an irradiator configured to irradiate the liquid discharge surface with the active-energy rays, a carriage mounting the discharge device and the irradiator, the carriage configure to move in a main-scanning direction, and circuitry configured to relatively move the carriage and the discharge target in the main-scanning direction, relatively move the carriage and the discharge target in a sub-scanning direction perpendicular to the main-scanning direction, and control illuminance of the active-energy rays emitted from the irradiator to the liquid discharge surface on the discharge target according to a length of a discharge range of the liquid discharge surface on the discharge target in the main-scanning direction.

20 Claims, 8 Drawing Sheets

(56) References Cited

U.S. PATENT DOCUMENTS

| | | | |
|---|---|---|---|
| 2017/0080720 A1 | 3/2017 | Mezaki | |
| 2018/0207956 A1 | 7/2018 | Mezaki | |
| 2019/0275810 A1 | 9/2019 | Matsuki et al. | |
| 2019/0308422 A1* | 10/2019 | Sakaki | B41J 11/002 |

FOREIGN PATENT DOCUMENTS

| | | |
|---|---|---|
| JP | 2015-136822 | 7/2015 |
| JP | 2018-118508 | 8/2018 |

\* cited by examiner

LIQUID DISCHARGE APPARATUS, LIQUID DISCHARGE METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2019-139220, filed on Jul. 29, 2019, in the Japan Patent Office, the entire disclosures of which is hereby incorporated by reference herein.

BACKGROUND

Technical Field

Aspects of the present disclosure relate to a liquid discharge apparatus, a liquid discharge method, and a non-transitory recording medium.

Related Art

A liquid discharge apparatus irradiates an active-energy ray curable ink discharged from the liquid discharge apparatus with an active energy rays such as ultraviolet (UV) light to cure the active-energy ray curable ink.

In such a technique, curing wrinkles may occur due to curing shrinkage at a boundary between a cured region cured by irradiation with active-energy rays and an unirradiated uncured region in an ink region of the discharged ink. In attempting to reduce curing wrinkles, a height that is a distance between an irradiator and a liquid discharge surface is adjusted according to a width of the liquid discharge surface in a sub-scanning direction. The irradiator emits the active energy rays.

SUMMARY

In an aspect of this disclosure, a liquid discharge apparatus includes a discharge device configured to discharge a liquid curable by active-energy rays onto a discharge target to form a liquid discharge surface, an irradiator configured to irradiate the liquid discharge surface with the active-energy rays, a carriage mounting the discharge device and the irradiator, the carriage configure to move in a main-scanning direction, and circuitry configured to relatively move the carriage and the discharge target in the main-scanning direction, relatively move the carriage and the discharge target in a sub-scanning direction perpendicular to the main-scanning direction, and control illuminance of the active-energy rays emitted from the irradiator to the liquid discharge surface on the discharge target according to a length of a discharge range of the liquid discharge surface on the discharge target in the main-scanning direction.

In another aspect of this disclosure, a liquid discharge method for discharging a liquid onto a discharge target includes: discharging a liquid curable by active-energy rays onto the discharge target to form a liquid discharge surface, irradiating the liquid discharge surface with the active-energy rays, moving a discharge position of the liquid onto the discharge target in a main-scanning direction, moving the discharge position in a sub-scanning direction perpendicular to the main-scanning direction, and controlling illuminance of the active-energy rays emitted to the liquid discharge surface on the discharge target according to a length of a discharge range of the liquid discharge surface on the discharge target in the main-scanning direction.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein.

Figure 1:
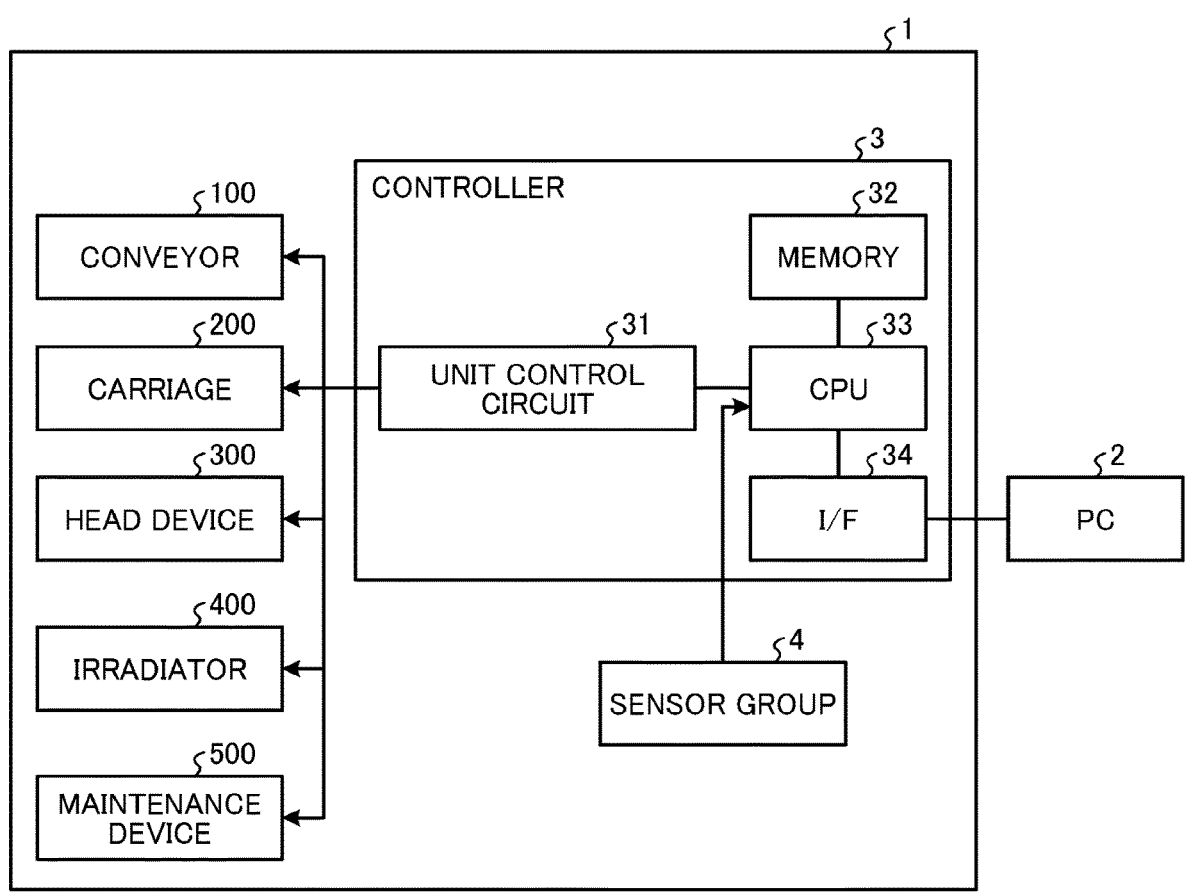
FIG. 1 is a block diagram illustrating a functional configuration of liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a," "an," and "the" are intended to include the plural forms as well, unless the context clearly indicates otherwise.

Embodiments of a liquid discharge apparatus, a liquid discharge method, and a recording medium is described in detail below with reference to the accompanying drawings. An example of application of the liquid discharge apparatus to an image forming apparatus according to the present embodiment is described below. The liquid discharge apparatus includes a liquid discharge head that discharges an ink as a liquid onto a substrate as a discharge target to form an image on the substrate. However, a target for the application of the liquid discharge apparatus is not limited to the image forming apparatus. For example, the liquid discharge apparatus may be applied to a three-dimensional fabrication apparatus that discharges the liquid from the liquid discharge head to fabricate a three-dimensional object.

Figure 2:
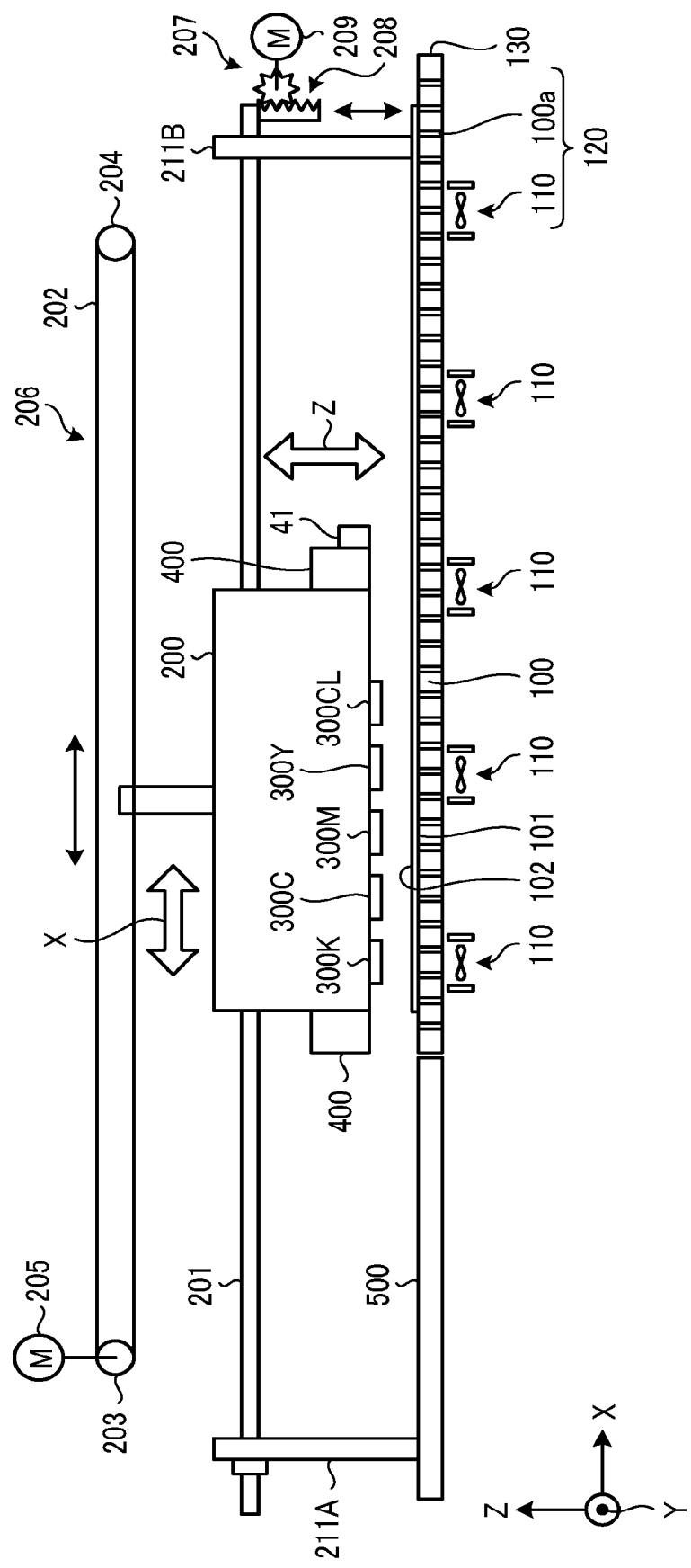
FIG. 2 is a schematic front view of the liquid discharge apparatus according to the embodiment of the present disclosure.
Figure 3:
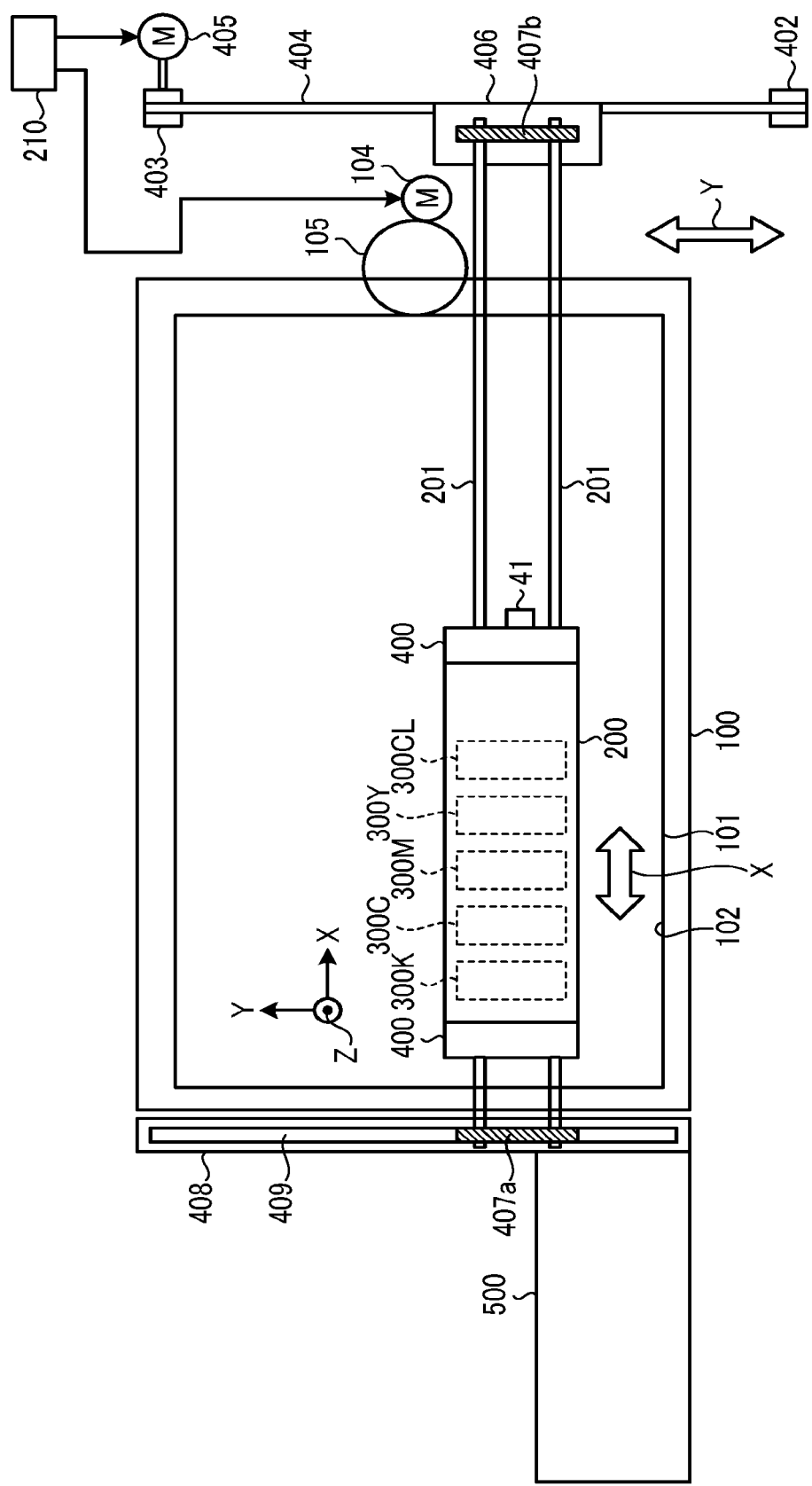
FIG. 3 is a schematic plan view of the liquid discharge apparatus according to the embodiment of the present disclosure.

FIG. 1 is a block diagram illustrating a functional configuration of liquid discharge apparatus 1 according to the present embodiment. FIG. 2 is a schematic front view of the liquid discharge apparatus 1. FIG. 3 is a schematic plan view of the liquid discharge apparatus 1.

As illustrated in FIG. 1, the liquid discharge apparatus 1 according to the present embodiment includes a controller 3, a sensor group 4, a conveyor 100, a carriage 200, a head device 300, an irradiator 400, and a maintenance device 500.

The controller 3 has a computer configuration, and includes a unit control circuit 31, a memory 32 that stores various data, a Central Processing Unit (CPU) 33 as a main control, and an interface (I/F) 34.

The unit control circuit 31 controls an operation of each unit such as the conveyor 100, the carriage 200, the head device 300, the irradiator 400, the maintenance device 500 of the liquid discharge apparatus 1 according to an instruction from the CPU 33.

The I/F 34 is an interface to connect the liquid discharge apparatus 1 to an external personal computer (PC) 2. The liquid discharge apparatus 1 and the PC 2 may be connected in any form. For example, the liquid discharge apparatus 1 and the PC 2 may be connected via a network or directly connected by a communication cable.

The sensor group 4 is, for example, various sensors in the liquid discharge apparatus 1 such as a height sensor 41 illustrated in FIGS. 2 and 3.

The memory 32 stores various programs and data executable by the CPU 33. As the memory 32, for example, an optical, magnetic, or electrical recording medium such as a hard disk, a compact disc read-only memory (CD-ROM), a digital versatile disk (DVD) can be used. Various programs are stored in the memory 32 in a data format readable by the CPU 33.

Various programs executed by the liquid discharge apparatus 1 according to the present embodiment is recorded and provided in a computer-readable recording medium, such as the CD-ROM, a flexible disk (FD), a compact disc-recordable (CD-R), or the DVD, in a file in installable or executable format.

Various programs executed by the liquid discharge apparatus 1 according to the present embodiment may be stored in a computer connected to a network such as the Internet and provided by being downloaded via the network. Further, various programs executed by the liquid discharge apparatus 1 according to the present embodiment may be provided or distributed via a network such as the Internet.

The CPU 33 of the controller 3 uses the memory 32 as a work area to control the operation of each unit of the liquid discharge apparatus 1 such as the conveyor 100, the carriage 200, the head device 300, the irradiator 400, and the maintenance device 500 via the unit control circuit 31. Specifically, the CPU 33 control operations of each unit such as the conveyor 100, the carriage 200, the head device 300, the irradiator 400, and the maintenance device 500 based on the recording data received from the PC 2 and the data detected by the sensor group 4. The CPU 33 thus can form an image as the liquid discharge surface 102 on the substrate 101 as the discharge target as illustrated in FIG. 2.

The substrate 101 is an example of a discharge target. The substrate 101 is, for example, a medium such as a recording sheet of paper, but is not limited to the recording sheet of paper.

A printer driver is installed in the PC 2, and the printer driver generates recording data to be transmitted to the liquid discharge apparatus 1 from print data. The recording data includes command data to operate the conveyor 100 of the liquid discharge apparatus 1 and the like, and print data related to an image (liquid discharge surface 102). The print data is composed of, for example, 2-bit data for each pixel, and is represented by 4 gradations.

As illustrated in FIG. 2, the conveyor 100 includes a stage 130 and a suction mechanism 120. The suction mechanism 120 includes fans 110 and a plurality of suction holes 100a provided in the stage 130. The suction mechanism 120 drives the fans 110 to suck the substrate 101 through the suction holes 100a to temporarily fix the substrate 101 to the conveyor 100. The suction mechanism 120 may attract the substrate 101 using electrostatic attraction.

The conveyor 100 moves in a Y-axis direction (sub-scanning direction Y) under the control of the drive signal from the CPU 33 via the unit control circuit 31.

As illustrated in FIG. 3, the conveyor 100 includes a conveyance controller 210, a roller 105, and a motor 104. The conveyance controller 210 drives the motor 104 to rotate the roller 105 to move the substrate 101 in the Y-axis direction (sub-scanning direction Y).

The conveyor 100 may move the carriage 200 instead of the substrate 101 in the Y-axis direction (sub-scanning direction Y). That is, the conveyor 100 relatively moves at least one of the substrate 101 and the carriage 200 in the Y-axis direction (sub-scanning direction Y).

As illustrated on the right side of FIG. 3, the conveyor 100 includes a side plate 407b that supports two guides 201 to guide the carriage 200 in the X-axis direction (main-scanning direction X), a base 406 that supports the side plate 407b, a belt 404 fixed to the base 406, a drive pulley 403 and a driven pulley 402 around which the belt 404 is wound, and a motor 405 that rotationally drives the drive pulley 403.

As illustrated on the left side of FIG. 3, the conveyor 100 includes a side plate 407a that supports the two guides 201 that guide the carriage 200 in the X-axis direction (main-scanning direction X), a base 408 that slidably supports the side plate 407a, and a groove 409 formed in the base 408 and guides the side plate 407a in the sub-scanning direction Y.

The conveyor 100 controls the conveyance controller 210 to drive the motor 405 to rotate the drive pulley 403 and move the belt 404 in the Y-axis direction (sub-scanning direction Y). The base 406 that supports the carriage 200 moves in the Y-axis direction (sub-scanning direction Y) together with the movement of the belt 404. Thus, the carriage 200 is movable in the Y-axis direction (sub-scanning direction Y). The side plate 407a moves in the Y-axis direction (sub-scanning direction Y) along the groove 409 in the table 408 as the base 406 moves in the Y-axis direction (sub-scanning direction Y).

The carriage 200 is controlled to move in the Z-axis direction (height direction Z) and the X-axis direction (main-scanning direction X) based on a drive signal from the CPU 33 (unit control circuit 31) that functions as a movement controller.

The carriage 200 scans and moves along the guide 201 in the main-scanning direction X (X-axis direction). A scanner 206 includes a drive pulley 203, a driven pulley 204, a drive belt 202, and a motor 205. The carriage 200 is fixed to the drive belt 202 wound around the drive pulley 203 and the driven pulley 204. The motor 205 drives to rotate the drive pulley 203 to move the drive belt 202 and the carriage 200 so that the carriage 200 moves and scans right and left in the main-scanning direction X. The guide 201 is supported by side plates 211A and 211B of an apparatus body of the liquid discharge apparatus 1.

A height adjuster 207 includes a motor 209 and a slider 208. The height adjuster 207 drives the motor 209 to move the slider 208 up and down to move the guide 201 up and down. As the guide 201 moves up and down, the carriage 200 moves up and down. Thus, the height adjuster 207 can adjust a height of the carriage 200 with respect to the substrate 101. Thus, the height adjuster 207 adjusts an irradiation distance (irradiation height) of the irradiator 400 on the head device 300 with respect to the substrate 101 as the discharge target.

The head device 300 is an example of a discharge part. The head device 300 discharges a liquid of an active-energy ray curable type. Following describes an example of the head device 300 according to the present embodiment that discharges an ink as the liquid.

Irradiation of the active energy rays cures the ink (liquid) discharged from the head device 300. Examples of such ink include UV curable ink, electron beam curable ink, and the like. The UV curable ink is, for example, an ink containing a methacrylate monomer. Methacrylate monomer has an advantage of relatively weak skin sensitization, which is a phenomenon that causes skin irritation due to excessive immune reactions caused by chemical substances. However, methacrylate monomer has a characteristic that a degree of curing shrinkage is larger than a degree of curing shrinkage of general ink.

The active energy rays are, for example, ultraviolet rays (UV rays), ultraviolet light (UV light) rays, electron rays, or the like.

The ink in the present embodiment is an ultraviolet (UV) curable ink that is cured by irradiation with UV light. The following example uses the UV light as the active energy rays.

The carriage 200 mounts the head device 300 on a lower surface of the carriage 200. The head device 300 includes heads 300K, 300C, 300M, 300Y, and 300CL that respectively discharge inks of, for example, black K, cyan C, magenta M, yellow Y, and transparent clear CL containing no colorant. Hereinafter, the "liquid discharge head" is simply referred to as the "head."

In the present embodiment, the clear CL is a UV curable ink (active-energy ray curable ink) among the black K, cyan C, magenta M, yellow Y, and clear CL inks. Further, the inks of black K, cyan C, magenta M, and yellow Y are UV uncurable inks (active-energy ray uncurable ink) that are not cured even when the inks are irradiated with the active-energy rays, as an example. At least one of the black K, cyan C, magenta M, yellow Y, and clear CL inks may be UV curable ink (active-energy ray curable ink). Thus, the present embodiment is not limited to the above-described example in which only the clear CL ink is the UV curable ink. For example, the ink other than the clear CL ink, such as black K may be the UV curable ink.

Each head of the head device 300 includes a piezo element (piezoelectric element). When a drive signal is applied to the head device 300 by the CPU 33 (unit control circuit 31), the piezo element (piezoelectric element) in the head device 300 contracts and causes pressure change in the head device 300 due to contraction of the piezo element to discharge the ink onto the substrate 101. Thus, the liquid discharge surface 102 made of the ink is formed on the substrate 101.

Figure 4:
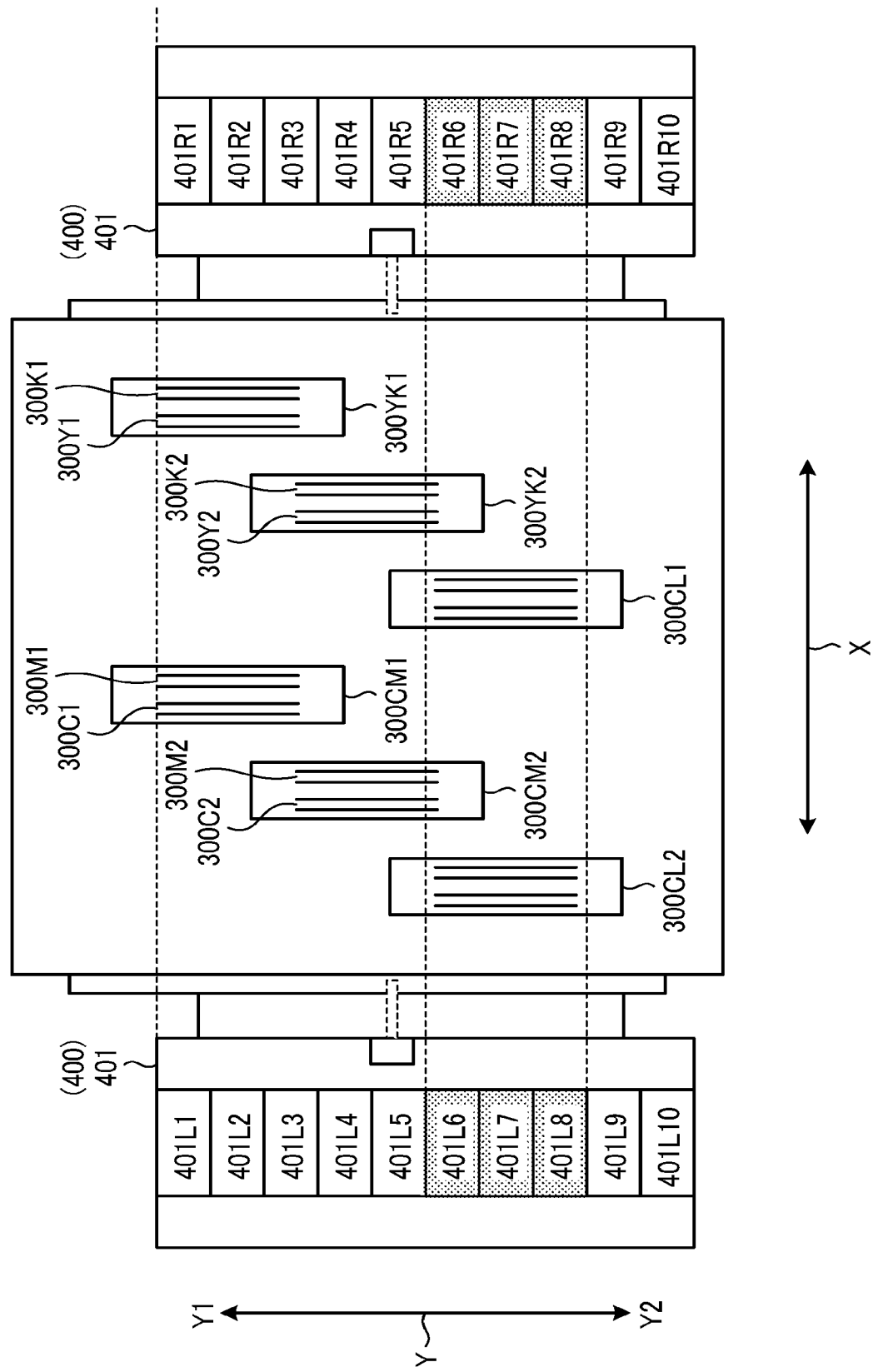
FIG. 4 is a schematic plan view of an example of a configurations of a head device and an irradiator viewed from bottom side of the head device.

FIG. 4 is a schematic plan view of an example of a configurations of the head device 300 and the irradiator 400 viewed from bottom side of the head device 300.

The head device 300 includes a plurality of heads (for example, six heads) arranged at mutually different positions in a staggered arrangement in the main-scanning direction X and the sub-scanning direction Y, for example. As illustrated in FIG. 4, the heads (300CL1 and 300CL2) that discharge clear CL inks are arranged on an upstream side (arrow Y2 side that directs downward in FIG. 4) of the heads (300CM2, 300CM1, 300YK1, and 300YK2) that discharge inks of other inks (cyan C, magenta M, black K) in the sub-scanning direction Y.

In FIG. 4 in the present embodiment, the upstream side in the sub-scanning direction Y is an arrow Y1 side directed upward in FIG. 4 that is a moving direction of the head device 300 and the substrate 101 relatively moved in the sub-scanning direction Y. An upstream direction (arrow Y1 direction) is opposite to a downstream direction (arrow Y2 direction) in the sub-scanning direction Y. Further, the downstream side in the sub-scanning direction Y is an arrow Y2 side directed downward in FIG. 4 that is another moving direction of the head device 300 and the substrate 101 relatively moved opposite to the arrow Y1 direction in the sub-scanning direction Y.

Specifically, in FIG. 4 in the present embodiment, the head (head 300CL2) arranged at the downstream end (end in the arrow Y2 direction) in the sub-scanning direction Y is the head of the clear CL ink.

Further, the heads 300CM2 and 300CM1 are arranged in an order from the head 300CL2 that is arranged on the downstream end (end in the arrow Y2 direction) toward the upstream side (arrow Y1 direction) in the sub-scanning direction Y in FIG. 4. Further, the heads 300CM2 and 300CM1 are arranged in a right side of the head 300CL2 in the main-scanning direction X (see FIG. 4). The heads 300CM1 and 300CM2 respectively include heads (300C1 and 300C2) that discharge the cyan C ink and heads (300M1 and 300M2) that discharge the magenta M ink.

Further, the heads 300YK2 and 300YK1 are arranged in an order from the head 300CL1 that is arranged on the downstream end (end in the arrow Y2 direction) toward the upstream side (arrow Y1 direction) in the sub-scanning direction Y in FIG. 4. Further, the heads 300YK2 and 300YK1 are arranged in the right side of the head 300CL1 in the main-scanning direction X (see FIG. 4). The heads 300YK1 and 300YK2 respectively include heads (300Y1 and 300Y2) that discharge the yellow Y ink and heads (300M1 and 300M2) that discharge the black K ink.

Thus, the carriage 200 and the substrate 101 relatively move in the arrow Y1 direction in the sub-scanning direction Y. The heads 300CM1, 300CM2, 300YK1, and 300YK2 arranged downstream side (arrow Y1 side) in the sub-scanning direction Y discharge any one of color inks (cyan C, magenta M, and black K) onto the substrate 101. Specifically, in FIG. 4 in the present embodiment, the heads (300CL1 and 300CL2) arranged at the downstream end (end in the arrow Y2 direction) in the sub-scanning direction Y discharge the clear CL ink that is UV curable ink.

The "upstream side" in the sub-scanning direction Y is also referred to as "one side" in the sub-scanning direction Y. The "downstream side" in the sub-scanning direction Y is also referred to as "another side" in the sub-scanning direction Y.

The carriage 200 mounts the irradiator 400 on each side surface (both end surfaces in the main-scanning direction X) of the carriage 200. The irradiator 400 irradiates UV light, which is an example of active-energy rays, based on a drive signal from the CPU 33 (unit control circuit 31).

As illustrated in FIG. 4, the irradiator 400 includes a plurality of irradiation devices 401 arranged along the sub-scanning direction Y. The irradiation devices 401 include irradiation devices 401L1 to 401L10 and irradiation devices 401R1 to 401R10.

Thus, the irradiator 400 includes a plurality of irradiation devices 401 arrayed in the sub-scanning direction Y.

The liquid discharge apparatus 1 thus configured moves the carriage 200 that mounts the head devices 300 and the irradiators 400 in the sub-scanning direction Y based on the drive signal from the CPU 33 (unit control circuit 31) to an initial position to form an image (liquid discharge surface 102) on the substrate 101.

Then, the height adjuster 207 moves the head device 300 to a height suitable for ink discharge based on a drive signal from the CPU 33 (unit control circuit 31). The height sensor 41 detects a height of the head device 300 so that the CPU 33 controls the height of the head device 300.

The carriage 200 reciprocally moves in the main-scanning direction X based on the drive signal from the CPU 33 (unit control circuit 31). During the reciprocal movement of the carriage 200, the head device 300 discharges ink based on the drive signal from the CPU 33 (unit control circuit 31). Thus, an image (liquid discharge surface 102) for one scan in the main-scanning direction X is formed on the substrate 101. When the image (liquid discharge surface 102) for one scan in the main-scanning direction X is formed on the substrate 101, the conveyor 100 moves the carriage 200 or the substrate 101 in the sub-scanning direction Y based on the drive signal from the CPU 33 (unit control circuit 31). Repetition of the scanning movement of the carriage 200 in the main-scanning direction X and scanning movement of the carriage 200 or the substrate 101 in the sub-scanning direction Y forms the image (liquid discharge surface 102) of ink on the substrate 101.

As described above, the carriage 200 mounts the irradiator 400 on both end surfaces of the carriage 200 in the main-scanning direction X. The irradiator 400 irradiates the substrate 101 with UV light while the head device 300 moves in the main-scanning direction X under the control of the CPU 33 (unit control circuit 31). Therefore, the irradiator 400 irradiates the ink discharged on the substrate 101 with the UV light to cure the ink (liquid discharge surface 102) on the substrate 101.

As described above, the liquid discharge apparatus 1 controls the head device 300 to discharge the ink on the substrate 101 and controls the irradiator 400 to irradiate the UV light on the ink (liquid discharge surface 102) on the substrate 101 while moving the carriage 200 in the main-scanning direction X. Thus, the liquid discharge apparatus 1 irradiates the ink (liquid discharge surface 102) on the substrate 101 with the UV light emitted from the irradiator 400 while discharging the ink from the head device 300.

The higher a resolution of the image to be formed on the substrate 101, the larger a number of scans of the carriage 200 in the main-scanning direction X. Therefore, the irradiator 400 frequently irradiates the UV light on the substrate 101, and the ink discharged onto the substrate 101 may be cured before the ink is leveled (flattened). The ink is irradiated with the UV light to be cured after a predetermined time has been elapsed after the ink is discharged onto the substrate 101 so that the ink is leveled (flattened). Therefore, the controller 3 preferably turns off a part of the plurality of irradiation devices 401 in the irradiator 400 and irradiates the substrate 101 with the UV light from only another part of the irradiation devices 401 during scanning of the head device 300 in the main-scanning direction X.

Specifically, the present embodiment describes an example in which the clear CL ink is the UV curable ink (active-energy ray curable ink) as described above.

If the clear CL ink is the UV curable ink, the controller 3 turns off the irradiation devices 401 including the irradiation device 401L6 to 401L8 and 401R6 to 401R8 arranged at positions overlapping with a position of the head 300CL2 in the sub-scanning direction Y among the plurality of irradiation devices 401 in the irradiator 400 arranged at both ends of the head device 300 in the main-scanning direction X.

The head 300CL2 discharges the clear CL ink. Then, the irradiation devices 401 other than the above-described irradiation devices 401 are turned on such as the irradiation devices 401L1 to 401L5, the irradiation devices 401L9 to 401L10, the irradiation devices 401R1 to 401R5, and the irradiation devices 401R9 to 401R10.

As a result, the clear CL ink discharged from the head 300CL2 onto the substrate 101 is leveled (flattened) on the substrate 101, and the irradiation device 401 including the irradiation devices 401L9, 401L10, 401R9, and 401R10 then irradiates the clear CL ink with the UV light. Thus, the clear CL ink can effectively produce image gross because the clear CL ink is cured by irradiation of the UV light after the clear CL ink is discharged onto the substrate 101 and leveled.

The active-energy ray curable ink such as the UV curable ink is discharged onto the substrate 101, leveled (flattened) on the substrate 101, and then irradiated with UV light (active-energy rays) so that an irradiation region of the UV light in the ink (liquid discharge surface 102) is cured and shrunk. Thus, wrinkles due to curing occur between an irradiated region in which the ink is cured and shrunk and an unirradiated region in which the ink is not irradiated with UV light. Hereinafter, the wrinkles due to curing is referred to as "curing wrinkles."

The curing wrinkles occur more significantly with increase of a time from an irradiation of the UV light during scanning of the carriage 200 in the main-scanning direction X to an irradiation of the UV light during subsequent scanning of the carriage 200 in the main-scanning direction X because of progress of curing. Thus, the curing wrinkles occur significantly with increase of a length of a discharge range of the ink on the substrate 101 as the discharge target in the main-scanning direction X.

Figure 5:
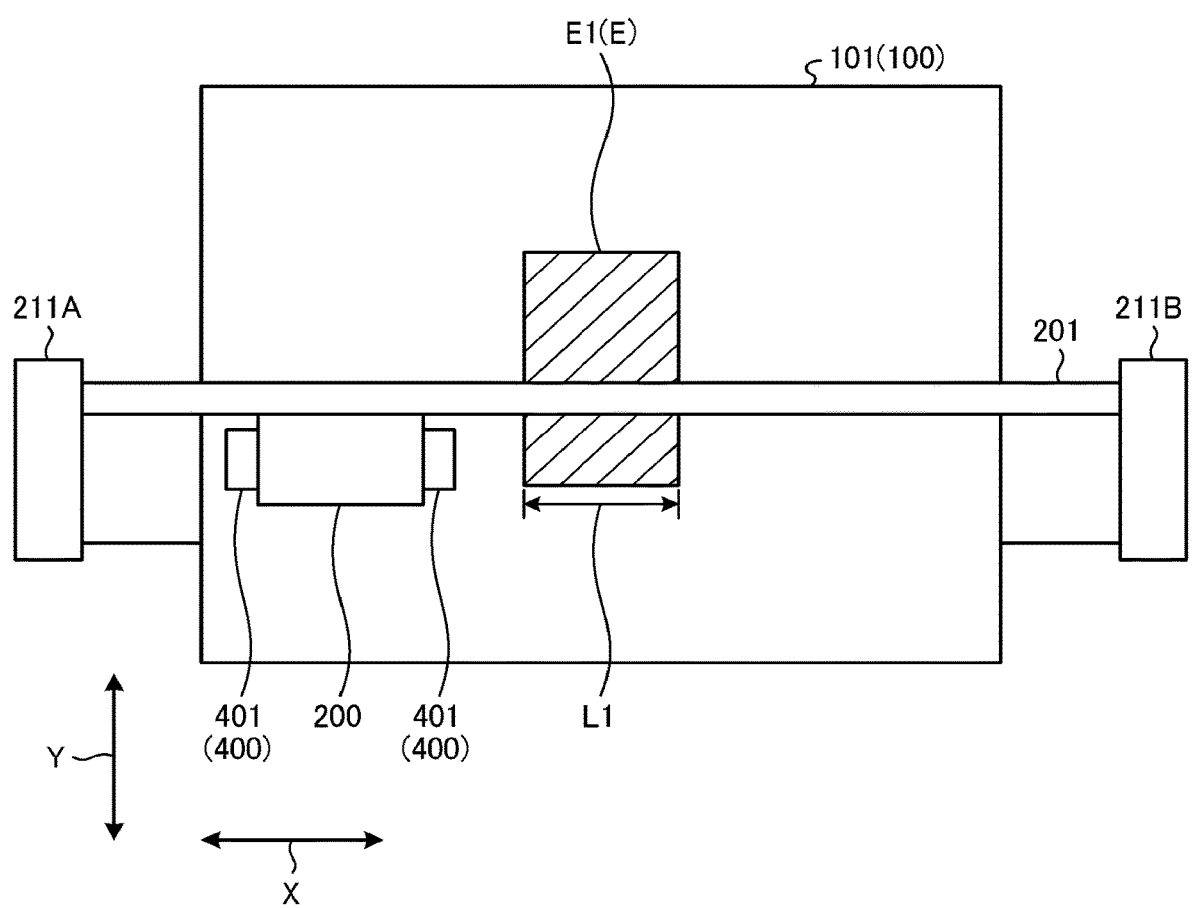
FIG. 5 is a schematic plan view of the liquid discharge apparatus illustrating an example in which a length of a print range in a main-scanning direction is short.

FIG. 5 is a schematic plan view of the liquid discharge apparatus 1 illustrating an example in which a length of a print range "E" as a discharge range in the main-scanning direction X is short.

The print range E is a discharge range in the substrate 101 as the discharge target. The active-energy ray curable ink such as the UV-curable ink is discharged onto the print range E in the substrate 101. That is, the print range E is a region in the substrate 101 onto which the active-energy ray curable ink such as the UV-curable ink is discharged. CPU 33 generates recording data based on print data related to an image (liquid discharge surface 102) and controls the head device 300 to discharge the ink according to a drive signal corresponding to the print data. Thus, an image is formed on the print range E in the substrate 101. Thus, the print range E is the range of the image (liquid discharge surface 102) formed on the substrate 101 based on the print data.

In FIG. 5, the print range "E1" is illustrated as an example of the print range E having a short length in the main-scanning direction X. A length of the print range E1 is indicated by arrow "L1" in FIG. 5. When the length of the print range E1 in the main-scanning direction X (see L1 in FIG. 5) is short, the carriage 200 mounting the head device 300 and the irradiator 400 scans in the main-scanning direction X so that the head device 300 discharges the ink onto the substrate 101 and the irradiator 400 irradiates the discharged ink after leveled (flattened) with the UV light.

After the carriage 200 and the substrate 101 relatively move in the sub-scanning direction Y, the carriage 200 scans again in the main-scanning direction X so that the head device 300 discharges the ink onto the substrate 101 and the irradiator 400 irradiates the discharged ink after leveled (flattened) with the UV light immediately after the previous irradiation of the UV light. Thus, if the length L of the print range E1 in the main-scanning direction X is short (L=L1), it is short a time difference between an irradiation timing to irradiate an irradiated region in the print range E1 in the substrate 101 with the UV light and an irradiation timing to irradiate an unirradiated region adjacent to the irradiated region in the sub-scanning direction Y. Thus, the curing wrinkles are difficult to occur.

Therefore, if the length L of the print range E1 in the main-scanning direction X is short (L=L1), even the illumination is increased to promote polymerizing reaction of the UV curable ink, a next print range of the UV curable ink is immediately irradiated with the UV light. Thus, the CPU 33 can prevent an occurrence of the curing wrinkles.

Figure 6:
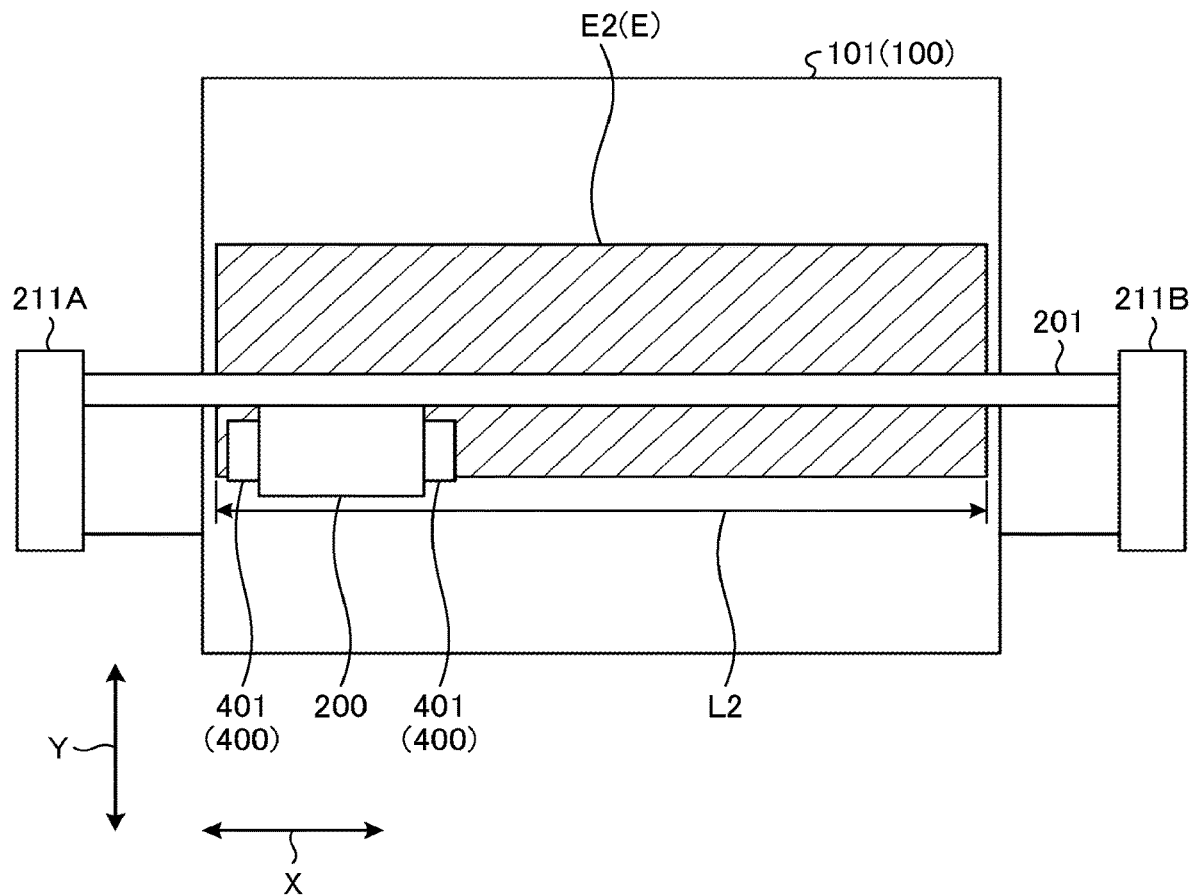
FIG. 6 is a schematic plan view of the liquid discharge apparatus illustrating an example in which a length of a print range in the main-scanning direction is long.

FIG. 6 is a schematic plan view of the liquid discharge apparatus 1 illustrating an example in which a length of a print range "E" as a discharge range in the main-scanning direction X is long.

In FIG. 6, the print range "E2" is illustrated as an example of the print range E having a long length in the main-scanning direction X. A length of the print range E2 is indicated by arrow "L2" in FIG. 6. When the length of the print range E2 in the main-scanning direction X (see L2 in FIG. 6) is long, the carriage 200 mounting the head device 300 and the irradiator 400 scans in the main-scanning direction X so that the head device 300 discharges the ink onto the substrate 101 and the irradiator 400 irradiates the discharged ink after leveled (flattened) with the UV light.

After the carriage 200 and the substrate 101 relatively move in the sub-scanning direction Y, the carriage 200 scans again in the main-scanning direction X so that the head device 300 discharges the ink onto the substrate 101 and the irradiator 400 irradiates the discharged ink after leveled (flattened) with the UV light after a certain time has passed since the previous irradiation of the UV light.

Thus, if the length L of the print range E2 in the main-scanning direction X is long (L=L2), it is long a time difference between an irradiation timing to irradiate an irradiated region in the print range E2 in the substrate 101 with the UV light and an irradiation timing to irradiate an unirradiated region adjacent to the irradiated region in the sub-scanning direction Y. Thus, the curing wrinkles are likely to occur.

Therefore, the CPU 33 (unit control circuit 31) in the liquid discharge apparatus 1 according to the present embodiment controls illuminance of UV light according to a length of the printing range E (discharge range) in the main-scanning direction X by the ink discharged onto the substrate 101 as the discharge target.

Figure 7:
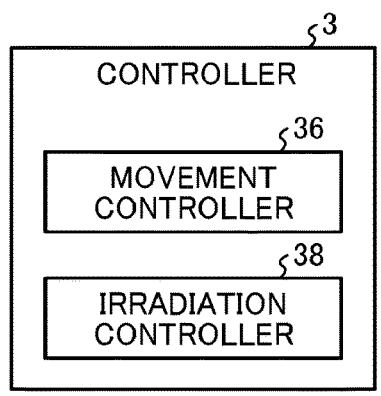
FIG. 7 is a schematic block diagram of an example of a functional configuration of a controller.

Following describes details of an illumination control of the irradiator 400 according to a first embodiment of the present disclosure. FIG. 7 is a schematic block diagram of an example of a functional configuration of the controller 3.

The controller 3 includes a movement controller 36 and an irradiation controller 38. The CPU 33 of the controller 3 executes a program stored in the memory 32 so that the controller 3 achieves functions of the movement controller 36 and the irradiation controller 38. Some or all of the functions achieved by the controller 3 of the liquid discharge apparatus 1 may be configured using a dedicated processing circuit such as an integrated circuit (IC).

The movement controller 36 controls the scanner 206 to move the carriage 200 (head device 300 and irradiator 400) in the main-scanning direction X, controls the height adjuster 207 to control a height of the carriage with respect to the substrate 101, and controls the conveyance controller 210 to relatively move the substrate 101 on the conveyor 100 and the carriage 200 in the sub-scanning direction Y.

The irradiation controller 38 controls the irradiator 400 to irradiate the liquid discharge surface 102 with UV light and cures the liquid discharge surface 102 while the irradiator 400 (carriage 200) moves in the main-scanning direction X.

The irradiation controller 38 in the first embodiment controls an illuminance of the UV light with which the liquid discharge surface 102 on the substrate 101 is irradiated from the irradiator 400 according to the length L of the print range E printed by the ink discharged onto the substrate 101 as the discharge target in the main-scanning direction X.

More specifically, the irradiation controller 38 controls the illuminance of the UV light with which the liquid discharge surface 102 on the substrate 101 is irradiated from the irradiator 400 so that an illuminance per unit area of the UV light, with which the substrate 101 as the discharge target is irradiated, decreases with an increase in the length L of the printing range E in the main-scanning direction X.

Thus, the irradiation controller 38 controls the illuminance of the UV light with which the liquid discharge surface 102 on the substrate 101 is irradiated from the irradiator 400 so that the illuminance per unit area of the UV light, with which the substrate 101 is irradiated, increases with a decrease in the length L of the printing range E in the main-scanning direction X.

The illuminance per unit area is controlled by adjusting at least one of an irradiation intensity of the irradiator 400 and an irradiation distance that is a distance between the irradiator 400 and the substrate 101.

The irradiation controller 38 controls the irradiation intensity of the irradiator 400 so that the irradiation intensity of the UV light irradiated from the irradiator 400 decreases with an increase in the length L of the print range E in the main-scanning direction X. In other words, the irradiation controller 38 controls the irradiation intensity of the irradiator 400 so that the irradiation intensity of the UV light irradiated from the irradiator 400 increases with a decrease in the length L of the print range E in the main-scanning direction X.

Specifically, the irradiation controller 38 previously stores a first relation information 50 indicating a relation between an irradiation intensity of the UV light and a length of the print data, which is original data used to discharge the ink on the print range E, in the main-scanning direction X. The length of the print data in the main-scanning direction X corresponds to the length L of the print range E in the main-scanning direction X. The liquid discharge surface 102 in the print range E in the substrate 101 is formed by the ink discharged onto the substrate 101 based on the print data.

Figure 8:
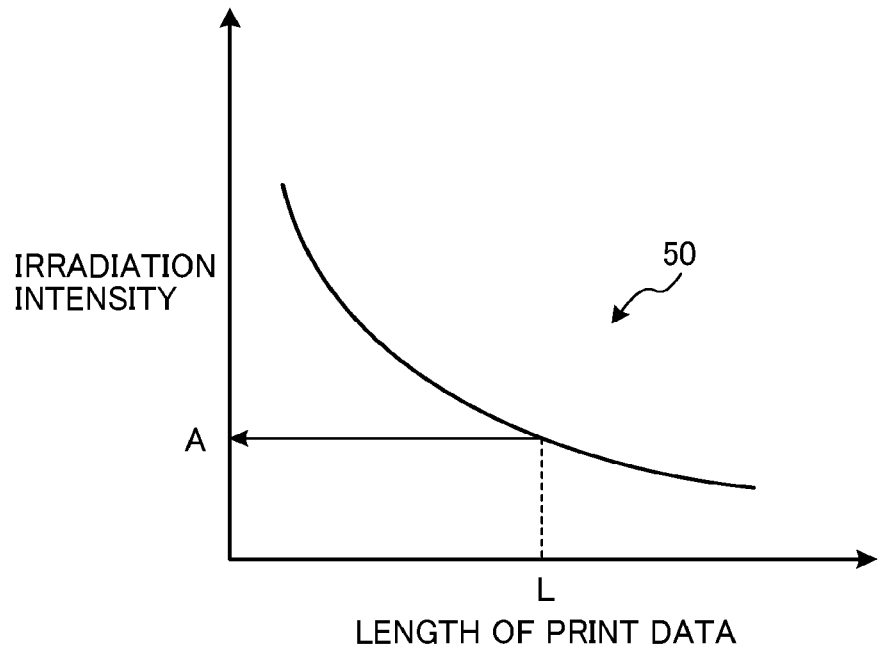
FIG. 8 is a graph illustrating an example of a first relation information according to the embodiment of the present disclosure.

FIG. 8 is a graph illustrating an example of a first relation information 50. In FIG. 8, the first relation information 50 is illustrated by a line indicating relation between the length L of the print data in the main-scanning direction X (X-axis) and the irradiation intensity (Y-axis). As illustrated in FIG. 8, the irradiation intensity decreases with an increase in the length of the print data (printing range E) in the main-scanning direction X in the first relation information 50.

Specifically, the CPU 33 (unit control circuit 31) in the controller 3 of the liquid discharge apparatus 1 may previously calculate the first relation information 50 and previously store the calculated first relation information 50 in the memory 32. The first relation information 50 indicates a relation between the length of the print data in the main-scanning direction X and the irradiation intensity that effectively reduces the curing wrinkles.

As illustrated in FIG. 8, the irradiation intensity decreases with an increase in the length of the print data (printing range E) in the main-scanning direction X in the first relation information 50 to reduce the curing wrinkles.

Then, the irradiation controller 38 may read, from the first relation information 50, the irradiation intensity (for example, the irradiation intensity A in FIG. 8) corresponding to the length L of the print range E that is derived from the print data in the main scanning direction X to determine the irradiation intensity. The irradiation intensity of the first relation information 50 may be represented by a voltage value of an applied voltage applied to each of the plurality of irradiation devices 401 in the irradiator 400.

The irradiation controller 38 may set the determined irradiation intensity as the irradiation intensity of the irradiation device 401 in the irradiator 400 and output a drive signal for irradiation of the UV light having set irradiation intensity to the irradiation devices 401.

Thus, the ink (UV curable ink) discharged onto the substrate 101 is irradiated with UV light having the set irradiation intensity from the irradiation devices 401 by the above-described processes.

Further, the irradiation controller 38 may adjust the irradiation distance as described above.

Thus, the irradiation controller 38 controls the height adjuster 207 so that the irradiation distance (height) that is a distance between the irradiator 400 (irradiation devices 401) and the substrate 101 increases with an increase in the length of the printing range E (discharge range) in the main-scanning direction X. In other words, the irradiation controller 38 controls the height adjuster 207 so that the irradiation distance (height) that is the distance between the irradiator 400 (irradiation devices 401) and the substrate 101 decreases with a decrease in the length L of the print range E in the main-scanning direction X.

Figure 9:
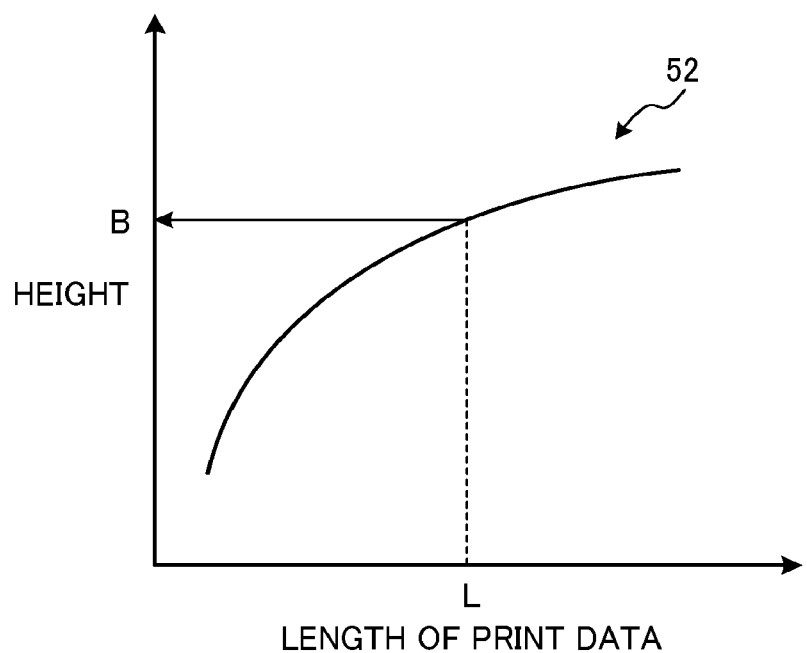
FIG. 9 is a graph illustrating an example of a second relation information according to the embodiment of the present disclosure.

Since the irradiator 400 includes a plurality of the irradiation devices 401, the irradiation controller 38 controls the height adjuster 207 so that the irradiation distances (heights) between the irradiation devices 401 and the substrate 101 increase with an increase in the length of the printing range E (discharge range) in the main-scanning direction X Specifically, the irradiation controller 38 previously stores a second relation information 52 in the memory 32. The second relation information 52 indicates a relation between the irradiation distance (height) and the length of the print data, which is original data used to discharge the ink on the print range E, in the main-scanning direction X. FIG. 9 is a graph illustrating an example of a second relation information 52.

In FIG. 9, the second relation information 52 is illustrated by a line of a relation between the length L of the print data in the main-scanning direction X in X-axis and a height (irradiation height) in Y-axis. The height corresponds to the irradiation distance, as described above. As illustrated in FIG. 9, the longer the length of the print data (printing range E) in the main-scanning direction X, the larger the irradiation distance (height) in the second relation information 52.

Specifically, the CPU 33 (unit control circuit 31) in the controller 3 of the liquid discharge apparatus 1 may previously calculate the second relation information 52 and previously store the calculated second relation information 52 in the memory 32. The second relation information 52 indicates a relation between the length of the print data in the main-scanning direction X and the irradiation distance (height) that effectively reduces the curing wrinkles. As illustrated in FIG. 9, the irradiation distance increases with an increase in the length of the print data (printing range E) in the main-scanning direction X in the second relation information 52 to reduce the curing wrinkles.

Then, the irradiation controller 38 may read the height (for example, the height B) corresponding to the length of the print range E derived from the print data in the main-scanning direction X from the second relation information 52 to set the irradiation distance (height).

The irradiation controller 38 controls the height adjuster 207 to vertically move the carriage 200 so that the irradiation distance (height) becomes the set irradiation distance. Thus, the irradiation controller 38 controls the distance between the substrate 101 and the irradiation devices 401 (irradiator 400) to be the set irradiation distance.

Further, the irradiation controller 38 may adjust at least one of the irradiation intensity of the irradiator 400 and the irradiation distance that is the distance between the irradiator 400 and the substrate 101 to control the illuminance per unit area of the UV light emitted from the irradiator 400 to the substrate 101. Following describes an example in which the irradiation controller 38 controls the irradiation intensity of the irradiator 400 to control the illuminance per unit area of the UV light with which the substrate 101 is irradiated from the irradiator 400.

When the UV light having the irradiation intensity set as described above is applied, an integrated light amount per unit area of the UV light, with which the liquid discharge surface 102 of ink (UV curable ink) discharged on the substrate 101 is irradiated, becomes less than an integrated amount of UV light necessary for curing the ink. The "integrated amount of UV light necessary for curing the ink" is also referred to as the "integrated amount of UV light to cure the ink."

Therefore, the irradiation controller 38 preferably determines whether the integrated light amount per unit area of the UV light with which the liquid discharge surface 102 on the substrate 101 is irradiated is equal to or larger than an integrated light amount of the UV light necessary for curing the ink. The "integrated light amount per unit area of the UV light with which the liquid discharge surface 102 on the substrate 101 is irradiated" is determined based on an integrated light amount of the UV light when the substrate 101 is irradiated with the UV light having the irradiation intensity set according to the length of the printing range E in the main-scanning direction X.

When the irradiation controller 38 determines that the integrated light amount per unit area of the UV light is equal to or larger than the integrated light amount necessary for curing the ink, the irradiation controller 38 sets the irradiation intensity of each of one or more of the irradiation devices 401 to the irradiation intensity set according to the length of the printing range E in the main-scanning direction X. The one or more of the irradiation devices 401 irradiates, a region of the liquid discharge surface 102 on the substrate 101 onto which the UV curable ink is discharged, with the UV light.

FIG. 4 is used to illustrate below the above-described illumination control. For example, the clear CL ink is assumed to be a UV curable ink. If the clear CL ink is the UV curable ink, the irradiation devices 401 that irradiate the clear CL ink discharged on the substrate 101 with the UV light by the scanning movement of the carriage 200 mounting the irradiator 400 and the head device 300 in the main-scanning direction X are the irradiation devices 401L9, 401L10, 401R9, and 401R10.

When the irradiation controller 38 determines that the integrated light amount per unit area of the UV light is equal to or larger than the integrated light amount of UV light necessary for curing the ink, the irradiation controller 38 sets the irradiation intensity of each of the irradiation devices 401L9, 401L10, 401R9, and 401R10 to the irradiation intensity set according to the length of the print range E in the main-scanning direction X.

Following describes a case in which the irradiation controller 38 determines that the integrated light amount per unit area of the UV light is less than the integrated light amount of UV light necessary for curing the ink. Then, the irradiation controller 38 sets the irradiation intensity of a part of the irradiation devices 401 (irradiation devices 401L9 and 401R9) to the set irradiation intensity set according to the length of the print range E in the main-scanning direction X. The part of the irradiation devices 401L9 and 401R9 are arranged in a downstream side (arrow Y2 direction) in the sub-scanning direction Y among the plurality of irradiation devices 401 to cure the clear CL ink arranged in the sub-scanning direction Y.

Then, the irradiation controller 38 sets the irradiation intensity of the irradiation devices 401 (irradiation devices 401L10 and 401R10) other than the irradiation devices 401L9 and 401R9 among the plurality of irradiation devices 401 for curing the clear CL ink to the illuminance higher than the set irradiation intensity so that the irradiation intensity of the irradiation devices 401L10 and 401R10 to be equal to or higher than the integrated light amount of UV light necessary for curing the ink.

Specifically, the irradiation controller 38 sets the irradiation intensity of the irradiation devices 401L9 and 401R9 to the irradiation intensity set according to the length of the print range E in the main-scanning direction X in the above-described case, for example. Further, the irradiation controller 38 sets the irradiation intensity of the irradiation devices 401L10 and 401R10 to be higher than the set irradiation intensity set according to the length of the print range E in the main-scanning direction X so that the irradiation intensity of the irradiation devices 401L10 and 401R10 becomes equal to larger than the integrated light amount of UV light necessary for curing the ink.

Next, an example of a flow of a method to set an illuminance executed by the liquid discharge apparatus 1 according to the present embodiment is described below.

Figure 10:
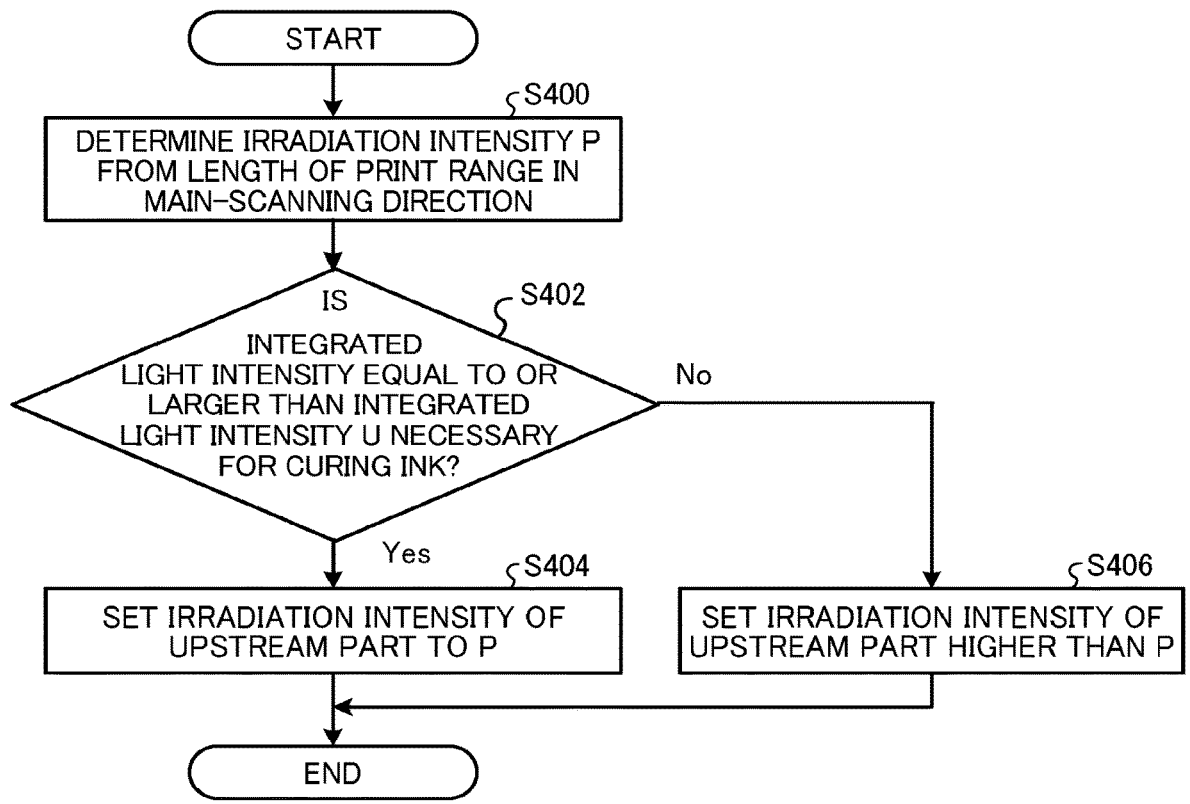
FIG. 10 is a flowchart illustrating an example of a flow to set an illuminance executed by the liquid discharge apparatus 1 (controller 3)

FIG. 10 is a flowchart illustrating an example of the flow to set the illuminance executed by the liquid discharge apparatus 1 (controller 3). The liquid discharge apparatus 1 may execute a process illustrated in FIG. 10 before discharging the ink (before an image formation) according to the print data.

The irradiation controller 38 determines the irradiation intensity from the length of the print range E (discharge range) of the ink discharged on the substrate 101 as the discharge target in the main-scanning direction X (step S400). In step S400, the irradiation controller 38 determines the irradiation intensity by reading the irradiation intensity corresponding to the length of the print range E in the main-scanning direction X from the first relation information 50. Hereinafter, the irradiation intensity determined in step S400 is referred to as an "irradiation intensity P."

Next, the irradiation controller 38 determines whether the integrated light amount based on the irradiation intensity P is equal to or larger than the integrated light amount U of UV light necessary for curing the UV curable ink discharged onto the substrate 101 (step S402). The "integrated light amount based on the irradiation intensity P" is an integrated light amount calculated in an assumption in which the irradiation devices 401 irradiate the substrate 101 with the UV light having the irradiation intensity P determined in step S400. The integrated light amount U of the UV light necessary for curing the UV curable ink may be previously stored in the memory 32.

If the irradiation controller 38 determines in step S402 that the integrated light amount is equal to or larger than the integrated light amount U (step S402: Yes), the process proceeds to step S404. In step S404, the irradiation controller 38 sets the irradiation intensity of each of the plurality of irradiation devices 401 (the irradiation devices 401L9, 401L10, 401R9, and 401R10, for example) to the irradiation intensity determined in step S404 (step S404).

The plurality of irradiation devices 401L9, 401L10, 401R9, and 401R10 irradiates the liquid discharge surface 102 onto which the UV curable ink is discharged with the UV light Then, the present routine that sets the illuminance ends.

Conversely, if the irradiation controller 38 determines in step S402 that the integrated light amount is less than the integrated light amount U (step S402: No), the process proceeds to step S406.

In step S404, the irradiation controller 38 sets, to the irradiation intensity P determined in step S400 (step S406), the irradiation intensity of part of the irradiation devices 401 (the irradiation devices 401L9 and 401R9) arranged in the upstream part (arrow Y1 direction) in the sub-scanning direction Y among the plurality of irradiation devices 401 (irradiation devices 401L9, 401L10, 401R9, and 401R10, for example) to irradiate the liquid discharge surface 102 onto which the UV curable ink is discharged with the UV light.

In step S406, the irradiation controller 38 sets, to an irradiation intensity larger than the irradiation intensity P determined in step S400 and equal to or larger than the integrated light amount U (step S406), the irradiation intensity of part of the irradiation devices 401 (the irradiation devices 401L10 and 401R10) arranged in the downstream part (arrow Y2 direction) in the sub-scanning direction Y. The irradiation devices 401L10 and 401R10 are part of the plurality of irradiation devices 401 (irradiation devices 401L9, 401L10, 401R9, and 401R10, for example) to irradiate the liquid discharge surface 102 onto which the UV curable ink is discharged with the UV light other than the irradiation devices 401 to which the irradiation intensity determined in step S400 is set. Then, the present routine that sets the illuminance ends.

Then, the irradiation controller 38 controls the irradiation devices 401 (irradiator 400) so that the irradiation devices 401 irradiate the liquid discharge surface 102 with the UV light having the irradiation intensity set in step S404 or step S404 when the head device 300 discharges the ink according to the print data.

As described above, the CPU 33 (unit control circuit 31) in the controller 3 of the liquid discharge apparatus 1 according to the present embodiment controls at least one of the irradiation devices 401 and the height adjuster 207 to adjust the illuminance of the UV light with which the liquid discharge surface 102 on the substrate 101 is irradiated from the irradiation devices 401 so that the longer the length of the printing range E in the main-scanning direction X, the lower the illuminance of the UV light emitted from the irradiation devices 401 (irradiator 400) onto the liquid discharge surface 102 on the substrate 101.

Therefore, if the length L of the print range E1 in the main-scanning direction X is long (L=L2), the illumination is decreased to slow (delay) polymerizing reaction of the UV curable ink that slows (delays) progress of curing shrinkage. Thus, the CPU 33 can prevent an occurrence of the curing wrinkles.

Therefore, the liquid discharge apparatus 1 according to the present embodiment irradiates the active-energy ray curable ink such as the UV curable ink discharged onto the substrate 101 with the UV light (active-energy rays) so that the liquid discharge apparatus 1 can reduce an occurrence of the curing wrinkles between the irradiated region in which the ink is cured and shrunk and the unirradiated region in which the UV light is not irradiated.

As described above, the liquid discharge apparatus 1 according to the present embodiment includes the head device 300 (discharge device), the irradiator 400 (irradiator), the movement controller 36, and the irradiation controller 38. The head device 300 (discharge unit) moves in the main-scanning direction X with the movement of the carriage 200 and discharges the UV curable ink (active-energy ray curable ink) while moving in the main-scanning direction X. The UV curable ink is an example of a liquid. The irradiation devices 401 (irradiator 400) moves in the main-scanning direction X and irradiates the ink (liquid) discharged from the head device 300 with the UV light (active-energy rays) from the irradiation devices 401 (irradiator 400) while moving in the main-scanning direction X.

The movement controller 36 relatively moves at least one of the carriage 200 and the substrate 101 (discharge target) in the main-scanning direction X and then relatively moves at least one of the carriage 200 and the substrate 101 (discharge target) in the sub-scanning direction Y perpendicular to the main-scanning direction X. The carriage 200 mounts the head device 300 and the irradiator 400.

The irradiation controller 38 controls the illuminance of the UV light (active-energy rays) emitted from the irradiator 400 to the liquid discharge surface 102 on the substrate 101 according to the length L of the printing range E of the ink (liquid) on the substrate 101 (discharge target) in the main-scanning direction X.

Therefore, the liquid discharge apparatus 1 according to the present embodiment can reduce the curing wrinkles.

Variation 1

Figure 11:
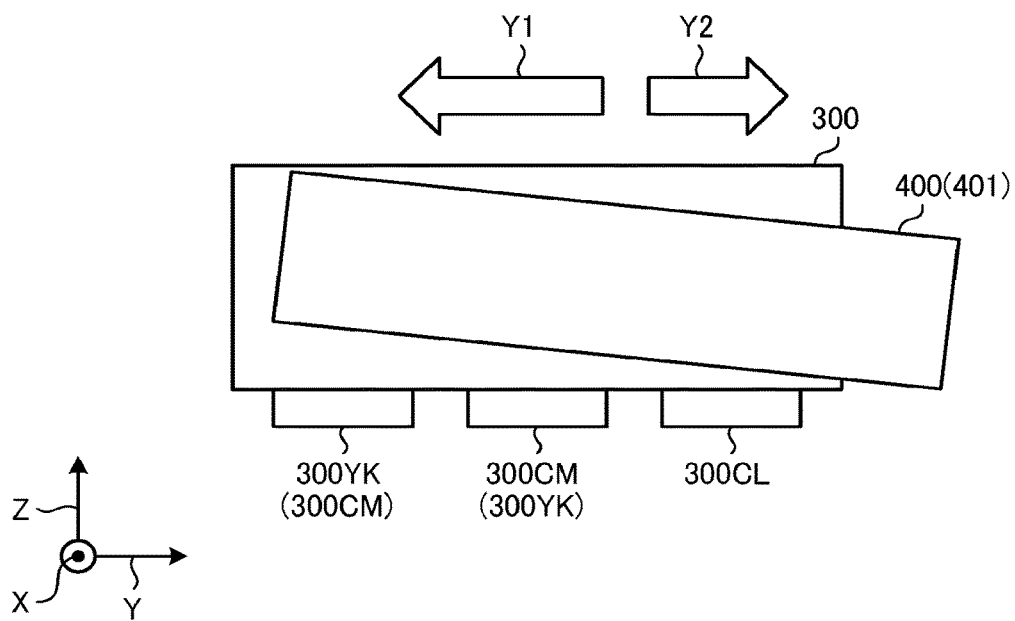
FIG. 11 is a schematic side view of a carriage mounting the head device and the irradiator illustrating an example of an arrangement of the irradiator according to a variation.

FIG. 11 is a schematic side view of the carriage 200 mounting the head device 300 and the irradiator 400 illustrating an example of an arrangement of the irradiator 400 according to a variation 1.

The irradiator 400 in the variation 1 has a configuration including a plurality of irradiation devices 401 arranged in the sub-scanning direction Y as in the above-described embodiments (see FIG. 4). Further, as described with reference to FIG. 4 in the above-described embodiments, the head device 300 includes a plurality of heads (for example, six heads) arranged at different positions in a staggered manner in the main-scanning direction X and the sub-scanning direction Y.

Further, as described with reference to FIG. 4 in the above-described embodiments, the heads (300CL1 and 300CL2) to discharge the clear CL ink are disposed at downstream side (arrow Y2 direction) in the sub-scanning direction Y of the other heads (300CM2, 300CM1, 300YK1, 300YK2) that discharge the other inks (cyan C, magenta M, and black K). The clear CL ink is the UV curable ink. The other inks (cyan C, magenta M, and black K) are the UV-uncurable inks.

The heads 300CL1 and 300CL2 are first heads (first discharge devices), and the heads 300CM1, 300CM2, 300YK1, and 300YK2 are second heads (second discharge devices).

In the above-described case, the plurality of irradiation devices 401 is preferably arranged such that the irradiation distance of the irradiator 400 with respect to the substrate 101 (discharge target) decreases toward the downstream side (arrow Y2 direction) in the sub-scanning direction Y as illustrated in FIG. 11.

That is, the irradiation distance between the irradiation devices 401 arranged on the downstream side (arrow Y2 direction) in the sub-scanning direction Y and the substrate 101 is smaller than the irradiation distance between the irradiation devices 401 arranged on the upstream side (arrow Y1 direction) in the sub-scanning direction Y and the substrate 101. The irradiation devices 401 arranged on the downstream side (arrow Y2 direction) in the sub-scanning direction Y irradiates the clear CL ink discharged from the head 300CL (head 300CL2) that discharges the clear CL ink as the UV curable ink with the UV light.

Such a configuration of the irradiator 400 can increase the illuminance of the UV light with which the substrate 101 is irradiated regardless of the irradiation intensity of the UV light irradiated from the irradiation devices 401. Therefore, the irradiation controller 38 can easily increase the integrated light amount of the UV light with emitted to the substrate 101.

The irradiation controller 38 may adjust an inclination of the irradiator 400 according to the integrated light amount based on the irradiation intensity P determined in step S400 in FIG. 10 in the above-described embodiments. The integrated light amount based on the irradiation intensity P is determined in step S400 in an assumption that the irradiator 400 irradiates the liquid discharge surface 102 on the substrate 101 with the UV light having the irradiation intensity determined in step S400.

To adjust the inclination of the irradiator 400, the irradiator 400 may include a driver to adjust the inclination of the irradiator 400 with respect to the surface of the substrate 101 (liquid discharge surface 102). The driver may have a mechanism that rotatably drives the irradiator 400 in a circumferential direction around the main-scanning direction X as a rotation axis. Then, the irradiation controller 38 may adjust the inclination of the irradiator 400 so that the irradiation distance between the irradiation devices 401L10 and 401R10 and the substrate 101 decreases with a decrease in the integrated light amount based on the irradiation intensity P determined in step S400 in FIG. 10 in the above-described embodiments.

The integrated light amount based on the irradiation intensity P is determined in step S400 in an assumption that the irradiator 400 irradiates the liquid discharge surface 102 on the substrate 101 with the UV light having the irradiation intensity determined in step S400.

Variation 2

The irradiation controller 38 described in the above embodiments may control the illuminance of the UV light (active-energy rays) emitted to the substrate 101 according to the length of the printing range E (discharge range) in the main-scanning direction X and a type of the substrate 101 as the discharge target.

To control the illuminance of the UV light, the irradiation controller 38 may previously store the first relation information 50 and the second relation information 52 in the memory 32 for each type of the substrate 101 (discharge target). Then, the irradiation controller 38 reads the first relation information 50 and the second relation information 52 corresponding to the type of the substrate 101 (discharge target) from the memory 32 to control the illuminance of the UV light (active-energy rays) as in the above-described embodiments.

Further, the irradiation controller 38 may control the illuminance of the UV light (active-energy rays) emitted to the substrate 101 according to the length of the print range E (discharge range) in the main-scanning direction X and at least one of the type of the substrate 101 (discharge target) and the type of UV curable ink to be discharged.

To control the illuminance of the UV light, the irradiation controller 38 may previously store the first relation information 50 and the second relation information 52 in the memory 32 for combinations of a type of the substrate 101 (discharge target) and a type of the UV curable ink discharged onto the substrate 101. Then, the irradiation controller 38 reads the first relation information 50 and the second relation information 52 corresponding to the combination of the type of the substrate 101 (discharge target) and the type of the UV curable ink (discharge liquid) from the memory 32 to control the illuminance of the UV light (active-energy rays) as in the above-described embodiments.

In the above-described embodiments and modified examples, the "liquid discharge apparatus" is a device that includes a liquid discharge head or a liquid discharge device and drives the liquid discharge head to discharge the liquid. The term "liquid discharge apparatus" used here includes, in addition to apparatuses to discharge liquid to materials on which the liquid can adhere, apparatuses to discharge the liquid into gas (air) or liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The term "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material onto which liquid can adhere" represents a material on which liquid is at least temporarily adhered, a material on which liquid is adhered and fixed, or a material into which liquid is adhered to permeate. Examples of the "material onto which liquid can adhere" include recording media, such as paper sheet, recording paper, recording sheet of paper, film, and cloth, electronic component, such as electronic substrate and piezoelectric element, and media, such as powder layer, organ model, and testing cell. The "material onto which liquid can adhere" includes any material on which liquid is adhered, unless particularly limited.

Examples of the "material onto which liquid can adhere" include any materials on which liquid can adhere even temporarily, such as paper, thread, fiber, fabric, leather, metal, plastic, glass, wood, and ceramic.

Further, the term "liquid" includes any liquid having a viscosity or a surface tension that can be discharged from the head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

The "liquid discharge apparatus" may be an apparatus to relatively move the head and a material onto which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat, with the treatment liquid, a sheet surface to reform the sheet surface and an injection granulation apparatus in which a composition liquid including raw materials dispersed in a solution is discharged through nozzles to granulate fine particles of the raw materials.

Any one of the above-described operations may be performed in various other ways, for example, in an order different from the one described above. The methods described above can be provided as program codes stored in a recording medium, to cause a processor to execute the method when executed by at least one processor.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

A non-transitory recording medium such as read-only memory (ROM) stores instructions which, when executed by one or more processors such as the CPU 33, cause the processors to perform the method as described in the present disclosure.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A liquid discharge apparatus, comprising:
   a discharge device to discharge a liquid curable by active-energy rays onto a discharge target to form a liquid discharge surface;
   an irradiator to irradiate the liquid discharge surface with the active-energy rays;
   a carriage mounting the discharge device and the irradiator; the carriage to move in a main-scanning direction; and
   circuitry configured to:
      relatively move the carriage and the discharge target in the main-scanning direction;
      relatively move the carriage and the discharge target in a sub-scanning direction perpendicular to the main-scanning direction; and
      control illuminance of the active-energy rays emitted from the irradiator to the liquid discharge surface on the discharge target according to a length of a discharge range of the liquid discharge surface on the discharge target in the main-scanning direction, wherein
   the circuitry decreases the illuminance of the active-energy rays emitted from the irradiator to the liquid discharge surface with an increase in the length of the discharge range in the main-scanning direction.

2. The liquid discharge apparatus according to claim 1, further comprising:
   a height adjuster to relatively move the carriage relative and the discharge target to adjust an irradiation distance between the irradiator and the discharge target, wherein
   the circuitry increases the irradiation distance with an increase in the length of the discharge range in the main-scanning direction.

3. The liquid discharge apparatus according to claim 2, wherein
   the irradiator includes a plurality of irradiation devices arrayed in the sub-scanning direction, and
   the circuitry decreases the irradiation distances between the plurality of irradiation devices and the discharge target from one side toward another side in the sub-scanning direction.

4. The liquid discharge apparatus according to claim 3, wherein
   the discharge device includes:
      a first discharge device configured to discharge an active-energy ray curable ink onto the discharge target; and
      a second discharge device configured to discharge an active-energy ray uncurable ink onto the discharge target, and
   the first discharge device is disposed to said another side of the second discharge device in the sub-scanning direction.

5. The liquid discharge apparatus according to claim 1, wherein
   the irradiator includes a plurality of irradiation devices arrayed in the sub-scanning direction; and
   the circuitry is configured to:
      set the illuminance of the active-energy rays emitted from the irradiator to the liquid discharge surface to a first illuminance according to the length of the discharge range in the main-scanning direction;
      determine whether an integrated light amount per unit area in the liquid discharge surface based on the first illuminance is less than an integrated light amount to cure the liquid;
      set a part of the plurality of irradiation devices disposed on one side in the sub-scanning direction to the first illuminance; and
      set another part of the irradiation devices disposed on another side in the sub-scanning direction to a second illuminance larger than the first illuminance.

6. The liquid discharge apparatus according to claim 5, wherein
   the discharge device includes:
      a first discharge device configured to discharge an active-energy ray curable ink onto the discharge target to form the liquid discharge surface; and
      a second discharge device configured to discharge an active-energy ray uncurable ink onto the discharge target to form the liquid discharge surface,
   the first discharge device is disposed to said another side of the second discharge device in the sub-scanning direction.

7. The liquid discharge apparatus according to claim 1, wherein the circuitry is configured to control the illuminance of the active-energy rays emitted from the irradiator to the liquid discharge surface according to the length of the discharge range in the main-scanning direction and a type of the discharge target.

8. The liquid discharge apparatus according to claim 1, wherein the circuitry is configured to irradiate the liquid discharge surface with the active-energy rays from the irradiator after an elapse of a predetermined time since the discharge device discharges the liquid onto the discharge target.

9. A liquid discharge apparatus, comprising:
   a discharge device to discharge a liquid curable by active-energy rays onto a discharge target to form a liquid discharge surface;
   an irradiator to irradiate the liquid discharge surface with the active-energy rays;
   a carriage mounting the discharge device and the irradiator, the carriage to move in a main-scanning direction; and
   circuitry configured to:
      relatively move the carriage and the discharge target in the main-scanning direction;
      relatively move the carriage and the discharge target in a sub-scanning direction perpendicular to the main-scanning direction; and
      control illuminance of the active-energy rays emitted from the irradiator to the liquid discharge surface on the discharge target according to a length of a discharge range of the liquid discharge surface on the discharge target in the main-scanning direction, wherein the circuitry decreases an irradiation intensity of the active-energy rays emitted from the irradiator to the liquid discharge surface with an increase in the length of the discharge range in the main-scanning direction.

10. The liquid discharge apparatus according to claim 9, further comprising:
a height adjuster to relatively move the carriage relative and the discharge target to adjust an irradiation distance between the irradiator and the discharge target, wherein
the circuitry increases the irradiation distance with an increase in the length of the discharge range in the main-scanning direction.

11. The liquid discharge apparatus according to claim 10, wherein
the irradiator includes a plurality of irradiation devices arrayed in the sub-scanning direction, and
the circuitry decreases the irradiation distances between the plurality of irradiation devices and the discharge target from one side toward another side in the sub-scanning direction.

12. The liquid discharge apparatus according to claim 11, wherein
the discharge device includes:
a first discharge device configured to discharge an active-energy ray curable ink onto the discharge target; and
a second discharge device configured to discharge an active-energy ray uncurable ink onto the discharge target, and
the first discharge device is disposed to said another side of the second discharge device in the sub-scanning direction.

13. The liquid discharge apparatus according to claim 9, wherein
the irradiator includes a plurality of irradiation devices arrayed in the sub-scanning direction; and
the circuitry is configured to:
set the illuminance of the active-energy rays emitted from the irradiator to the liquid discharge surface to a first illuminance according to the length of the discharge range in the main-scanning direction;
determine whether an integrated light amount per unit area in the liquid discharge surface based on the first illuminance is less than an integrated light amount to cure the liquid;
set a part of the plurality of irradiation devices disposed on one side in the sub-scanning direction to the first illuminance; and
set another part of the irradiation devices disposed on another side in the sub-scanning direction to a second illuminance larger than the first illuminance.

14. The liquid discharge apparatus according to claim 13, wherein
the discharge device includes:
a first discharge device configured to discharge an active-energy ray curable ink onto the discharge target to form the liquid discharge surface; and
a second discharge device configured to discharge an active-energy ray uncurable ink onto the discharge target to form the liquid discharge surface,
the first discharge device is disposed to said another side of the second discharge device in the sub-scanning direction.

15. The liquid discharge apparatus according to claim 9, wherein the circuitry is configured to control the illuminance of the active-energy rays emitted from the irradiator to the liquid discharge surface according to the length of the discharge range in the main-scanning direction and a type of the discharge target.

16. The liquid discharge apparatus according to claim 9, wherein the circuitry is configured to irradiate the liquid discharge surface with the active-energy rays from the irradiator after an elapse of a predetermined time since the discharge device discharges the liquid onto the discharge target.

17. A liquid discharge method for discharging a liquid onto a discharge target, the liquid discharge method comprising:
discharging a liquid curable by active-energy rays onto the discharge target to form a liquid discharge surface;
irradiating, with an irradiator, the liquid discharge surface with the active-energy rays;
moving a discharge position of the liquid onto the discharge target in a main-scanning direction;
moving the discharge position in a sub-scanning direction perpendicular to the main-scanning direction; and
controlling illuminance of the active-energy rays emitted to the liquid discharge surface on the discharge target according to a length of a discharge range of the liquid discharge surface on the discharge target in the main-scanning direction, wherein
the controlling the illuminance includes decreasing the illuminance of the active-energy rays emitted from the irradiator to the liquid discharge surface with an increase in the length of the discharge range in the main-scanning direction.

18. A non-transitory recording medium storing instructions which, when executed by one or more processors, cause the one or more processors to execute the liquid discharge method according to claim 17.

19. The liquid discharge method according to claim 17, further comprising:
moving a carriage relative and the discharge target to adjust an irradiation distance between the irradiator and the discharge target, wherein
the controlling the illuminance includes increasing the irradiation distance with an increase in the length of the discharge range in the main-scanning direction.

20. The liquid discharge method according to claim 17, wherein the controlling the illuminance of the active-energy rays emitted from the irradiator to the liquid discharge surface according to the length of the discharge range in the main-scanning direction and a type of the discharge target.

* * * * *